July 29, 1958 A. W. MASSMAN 2,845,487
AMPLITUDE-STABILIZED SYNC SIGNAL SEPARATOR
Filed Oct. 8, 1954
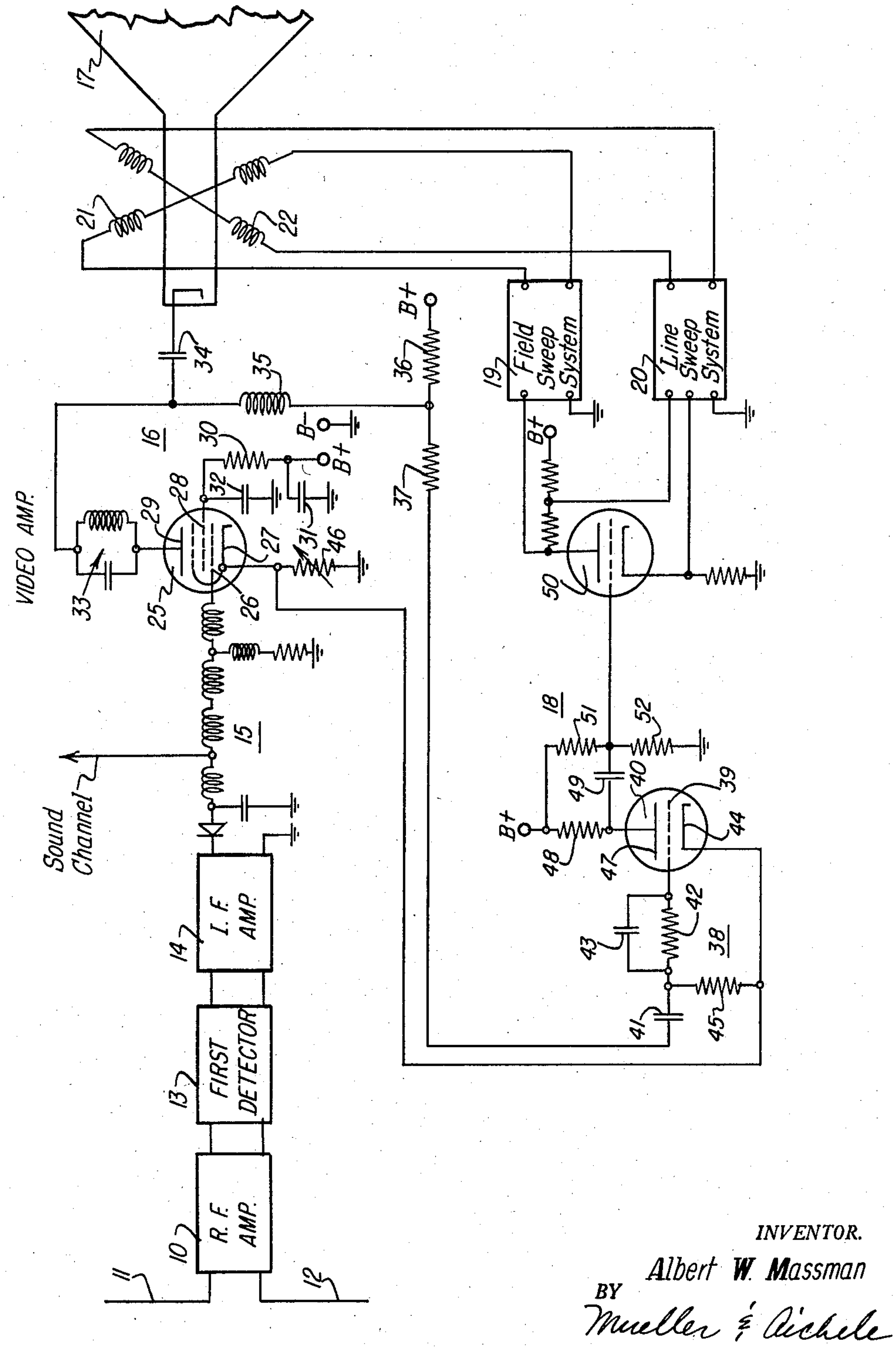
INVENTOR.
Albert W. Massman
BY
Mueller & Aichele
Atty United States Patent Office 2,845,487

Patented July 29, 1958

2,845,487

AMPLITUDE-STABILIZED SYNC SIGNAL SEPARATOR

Albert W. Massman, Wheaton, Ill., assignor to Motorola, Inc., Chicago, Ill., a corporation of Illinois Application October 8, 1954, Serial No. 461,157

2 Claims. (Cl. 178—7.3)

The present invention relates to television receivers and more particularly to a television receiver incorporating an improved system for separating the synchronizing components from a received and demodulated television signal.

Present day monochrome television signals are constituted by video frequency components and synchronizing components, the latter being pedestalled on blanking components to extend into the blacker than black region and have an amplitude exceeding the maximum amplitude of the video frequency components. The synchronizing components are separated in the television receiver after the television signal has been demodulated by means of a suitably biased amplitude selective separator. More specifically, an incoming television signal is demodulated in the television receiver to produce a composite video signal, and the latter signal is amplified in one or more video amplifier stages. It is usual to select the composite video signal from the output of the video amplifier for application to the synchronizing signal separator, since it is desirable that this signal have as much amplification as possible before being applied to the separator. However, it is also usual in television receivers to provide a contrast control in the video amplifier which controls the gain of the video amplifier. With such an arrangement, and under conditions where the contrast control has been set to low contrast with resulting low amplitude of the composite video signal, the composite video signal has been found to have insufficient amplitude for efficient synchronizing signal separation in the separator stage. This condition can result in the field scanning system locking with the blanking pulses of the composite video signal or with the picture content, both of which causes spurious vertical movement of the reproduced image. Also, this condition can affect the line synchronization causing pulling of the horizontal lines.

It is an object of the present invention to provide a television receiver which is constructed in an improved and simplified manner so that efficient synchronizing signal separation is achieved, and which separation is unaffected by wide variations in the contrast setting of the receiver.

A feature of the invention is the provision of a television receiver in which the video amplifier is coupled to the synchronizing signal separator to supply the composite video signal thereto, and in which the cathodes of the video amplifier and separator discharge devices are both returned to ground through the variable degeneration contrast control cathode resistor of the video amplifier. This latter connection permits the separator to produce a relatively low alternating-current impedance across the cathode resistor of the video amplifier during the sync pulse intervals when current flows through the generator, thereby decreasing the degenerative effect of this resistor and increasing the amplification of the amplifier during these intervals and effectively lengthening the synchronizing pulses. This action has been found to result in efficient synchronizing pulse separation in the receiver regardless of setting of the contrast control.

The above and other features of the invention which are believed to be new are set forth with particularity in the appended claims. The invention itself, however, together with further objects and advantages thereof, may best be understood by reference to the following description when taken in conjunction with the accompanying drawing in which the single figure shows a television receiver constructed in accordance with the invention.

The invention provides a receiver for utilizing a television signal which includes video frequency components and synchronizing components. The receiver comprises apparatus for receiving and demodulating the television signal to produce a composite video signal including the video frequency and synchronizing components. A video amplifier is coupled to the apparatus for amplifying the composite video signal, and the amplifier includes a discharge device having a cathode. A synchronizing signal separator is provided, and the separator includes a discharge device having a cathode. Circuit means couples the video amplifier to the separator to supply the composite video signal thereto, and a variable degenerative resistor means across which the composite video signal appears, connects the cathode of the video amplifier and the cathode of the separator to a point of reference potential for the reasons set forth previously herein.

The illustrated receiver includes a radio frequency amplifier 10 of one or more stages and having input terminals connected to an antenna 11, 12 and output terminals connected through a first detector 13 to an intermediate frequency amplifier 14 of any desired number of stages. The output terminals of amplifier 14 are coupled to a second detector 15 which in turn is coupled through a video amplifier 16 to the input electrode of a cathode ray image reproducing device 17. Video amplifier 16 is coupled to a synchronizing signal separator 18 which is connected to a field sweep system 19 and line sweep system 20. The sweep systems are connected respectively to the field deflection elements 21 and line deflection elements 22 of reproducing device 17.

A monochrome television signal intercepted by antenna 11, 12 is amplified by radio frequency amplifier 10 and heterodyned to the selected intermediate frequency of the receiver in first detector 13. The resulting intermediate frequency signal is amplified in amplifier 14 and demodulated in second detector 15.

The second detector 15 produces, in response to the received television signal, a composite video signal having video frequency components and synchronizing components, and the detector is connected with a polarity such that the composite video signal appears on a negative axis with respect to a point of reference potential or ground and with the synchronizing components extending in a negative going direction.

The composite video signal is amplified in amplifier 16 and is impressed on separator 18 with the synchronizing components extending in a positive going direction. The line and field synchronizing components are separated from the composite video signal in separator 18 and are used to synchronize the field sweep system 19 and line sweep system 20 respectively.

In the above described manner, the composite video signal is impressed on reproducer 17 from video amplifier 16 to control the intensity of the cathode ray beam therein, and the line and field sweeps of the reproducer are synchronized with the incoming television signal. Device 17, accordingly, is able to reproduce the televised information. The sound channel of the receiver forms no part of the present invention and, for that reason, has not been shown.

Video amplifier 16 includes an electron discharge device 25 having a control electrode 26, a cathode 27, a screen electrode 28 and an anode 29. The device also includes a suppressor electrode which is connected to the cathode in well known manner. The control electrode of device 25 is coupled to the second detector 15 through a direct-current coupling circuit of usual design. The screen electrode is connected through a dropping resistor 30 to the positive terminal B+ of a source of unidirectional potential, the negative terminal of this source being connected to the point of reference potential or ground, and the source being bypassed for alternating currents by a capacitor 31. Screen electrode 28 is bypassed to ground through a capacitor 32.

The anode 29 of video amplifier discharge device 25 is coupled through an intercarrier sound trap 33 and a capacitor 34 to the input electrode of image reproducer 17. The junction of the trap and capacitor 34 is connected through a peaking coil 35 and resistor 36 to the positive terminal B+ of the unidirectional potential source. The junction of coil 35 and resistor 36 is connected through a resistor 37 and a double time constant network 38 to the control electrode 39 of an electron discharge device 40. Discharge device 40 constitutes the first stage of synchronizing signal separator 18. The double time constant network 38 includes a capacitor 41 and resistor 42 series connected between resistor 37 and control electrode 39. Resistor 42 is shunted by a capacitor 43, and the junction of capacitor 41 and resistor 42 is connected to the cathode 44 of device 40 through a resistor 45. The cathode 27 of video amplifier device 25 and the cathode 44 of separator device 40 are both returned to ground through a common degenerative variable resistor 46 constituting a variable direct-current impedance means for controlling the gain of the video amplifier 16 and, therefore, the contrast of the receiver.

Separator device 40 has an anode 47 connected through a load resistor 48 to the positive terminal B+. The anode 47 is further coupled through a capacitor 49 to the control electrode of an electron discharge device 50. Device 50 constitutes a second stage in the synchronizing separator 18, and its control electrode is biased positively by a potentiometer 51, 52 connected between a positive terminal B+ and ground. Device 50 is connected in known manner to field sweep system 19 and to line sweep system 20.

The output circuit 33—37 of video amplifier 16 supplies the amplified composite video signal to the synchronizing separator 18. As previously noted, the composite video signal impressed on the separator has its synchronizing components extending in a positive going direction. The double time constant network 38 functions in known manner to provide a self-bias for device 40 so that the device will be driven into a conductive state by each of the synchronizing components and, therefore, clip a selected portion of the synchronizing components from the composite video signal regardless of the actual amplitude of the signal. Moreover, as is known, the double time constant network provides some protection from noise paralysis of the separator. The resulting signal from device 40 has the synchronizing components extending in a negative going direction, and device 50 functions as a further clipper since only the negative going synchronizing components have sufficient amplitude to overcome the positive bias of the control electrode of that device so as to be translated thereby. Device 50 may additionally function as a phase splitter when a line synchronizing system such as that disclosed in Massman Patent 2,645,717—July 19, 1953, is used.

It has been found that, without further compensation, the synchronizing process of the receiver is affected in the manner described previously herein for low contrast settings of video amplifier 27. This effect is eliminated by the circuit of the present invention in which the cathode 44 of clipper 40 is returned to the cathode 27 of video amplifier 25. This connection sets up two conditions. One is that since the composite video signal appears across degenerative resistor 46, it allows the video amplifier to feed the composite video signal with negative polarity to the cathode of device 40 to strengthen the signal applied to its control grid through the time constant network and assist in the synchronizing separation process. Another effect, perhaps more important, is the fact that the flow of current through device 40 during the interval of each synchronizing pulse produces a relatively low alternating-current impedance across cathode resistor 46 with a corresponding decrease in degeneration and increase in gain of device 25 during such interval. This causes the device to exhibit increased amplification for the synchronizing pulses. This effect occurs only during retrace and, therefore, has no effect on the contrast of the reproduced image. The contrast, therefore, remains at the desired low level, but the device selectively amplifies the synchronizing components so that the synchronizing process is unimpaired.

In a constructed embodiment of the invention, the following values were used for the circuit elements and these values are listed herein merely as an example of a successful commercial embodiment of the invention, but are not intended to limit the invention in any way:

| | | |
|---|---|---|
| Device 25 | | 12BY7 |
| Device 40 | | ½ 6SN7 |
| Device 50 | | ½ 6SN7 |
| Resistor 36 | kilohms | 3 |
| Resistor 37 | do | 10 |
| Capacitor 41 | microfarads | .005 |
| Capacitor 43 | do | 270 |
| Resistor 42 | kilohms | 470 |
| Resistor 45 | megohms | 1.5 |
| Resistor 48 | do | 1 |
| B+ | volts | 150 |
| Variable resistor 46 | ohms | 350 |

The receiver of the present invention has been constructed and utilized commercially. It has been found that the disclosed circuit operates with a high degree of efficiency to maintain satisfactory synchronizing separation throughout a wide range of contrast settings.

While a particular embodiment of the invention has been shown and described, modifications may be made and it is intended in the appended claims to cover all such modifications as fall within the true spirit and scope of the invention.

I claim:

1. A receiver for utilizing a television signal which includes video frequency components and synchronizing components, said receiver including in combination, apparatus for receiving and demodulating the television signal to produce a composite video signal including the video frequency and synchronizing components, with said composite video signal being disposed on a negative axis with respect to a reference potential and with the synchronizing components extending in a negative-going direction; a video amplifier for amplifying the composite video signal from said apparatus and including an electron discharge device having a cathode, a control electrode and an anode; circuit means coupling said apparatus to said control electrode to apply said composite video signal to said amplifier between said control electrode and a point of said reference potential with the synchronizing components thereof extending in the negative-going direction; an output circuit coupled to said anode in which said composite video signal appears with the synchronizing components having positive-going polarity; a synchronizing signal separator including an electron discharge device having an anode, a cathode and a control electrode; a time-constant circuit including grid-leak resistor means connected between said control electrode and said cathode of said separator discharge device, said time-constant circuit coupling said output circuit of said video amplifier to said separator control electrode to supply said composite video signal to said separator discharge device between said control electrode and cathode thereof with each of the synchronizing components of said composite video signal extending in the positive-going direction and driving such discharge device to a conductive state; a variable degenerative resistor across which said composite video signal appears connecting said cathode of said video amplifier discharge device to said point of reference potential; a direct-current connection from said cathode of said video amplifier to said cathode of said separator discharge device; and a utilization circuit coupled to the anode of said separator discharge device.

2. A receiver for utilizing a television signal which includes video frequency components and synchronizing components, said receiver including in combination, receiver circuit means for receiving and demodulating the television signal to produce a composite video signal including the video frequency and synchronizing components, a video amplifier for amplifying the composite video signal and including a first electron discharge device having a cathode, a control electrode, and an anode; circuit means coupling said receiver circuit means to said control electrode to apply said composite video signal to said control electrode of said first electron discharge device with the synchronizing components thereof extending in a negative-going direction with respect to a point of reference potential; an output circuit coupled to said anode for deriving the composite video signal with the synchronizing components having positive-going polarity with respect to the reference point; a synchronizing signal separator including a second electron discharge device having an anode, a cathode, and a control electrode; a resistor-capacitor network coupling said output circuit of said video amplifier to said control electrode and said cathode of said second discharge device to apply said composite video signal to said second discharge device between said control electrode and said cathode thereof with the synchronizing components of said composite video signal extending in the positive-going direction on said control electrode, said resistor-capacitor network including self biasing means for said second discharge device and said synchronizing components driving such discharge device into a conductive state for self bias thereof, said resistor-capacitor network including resistor means forming at least a part of a return path from said control electrode of said second discharge device to the point of reference potential, said resistor-capacitor network also including a direct current connection between said cathodes of said first and second discharge devices and a variable degenerative resistor connecting said direct current connection to the point of reference potential, and a utilization circuit coupled to said anode of said second discharge device.

References Cited in the file of this patent

UNITED STATES PATENTS

| | | |
|---|---|---|
| 2,673,892 | Richman | Mar. 30, 1954 |

FOREIGN PATENTS

| | | |
|---|---|---|
| 113,912 | Australia | Oct. 9, 1941 |